Sept. 14, 1965 J. P. STELMAK 3,206,340

PROCESS FOR TREATING SEMICONDUCTORS

Filed June 22, 1960

WITNESSES:

*Wm. C. Groome*

*Charles L. Menzemer*

INVENTOR

John P. Stelmak.

BY

*Frederick Shapoe*

ATTORNEY

United States Patent Office 3,206,340
Patented Sept. 14, 1965

3,206,340

PROCESS FOR TREATING SEMICONDUCTORS

John P. Stelmak, Greensburg, Pa., assignor to Westinghouse Electric Corporation, East Pittsburgh, Pa., a corporation of Pennsylvania Filed June 22, 1960, Ser. No. 38,051
5 Claims. (Cl. 148—183)

This invention relates generally to a process for treating a body of semiconductor material, and more particularly to a process for forming a low resistance path therein.

In the fabrication of a monolithic multifunctional semiconductor device in a unitary body of a semiconductor material, it is often necessary to form low resistance electrical paths between two points located on the same or different surfaces of the body of semiconductor material. Various methods have been tried for forming such a low resistance path, for example by alloying and diffusion, however, these methods have either been not entirely satisfactory or were tedious and required a great deal of control, and thus were not readily adaptable to assembly line production.

An object of the present invention is to provide a process for forming a low resistance path between two points or surfaces of a body of a semiconductor material comprising, depositing a metal layer at each of the two points to be so joined, contacting each of the two points with an electrical probe, and discharging a capacitor through the two probes, whereby, the temperature of the semiconductor material at or between the points of discharge is raised to a temperature above its melting point and upon recrystallization, the recrystallized portion will form a path of low resistance between the two points.

Another object of the present invention is to provide a body of a semiconductor material having an area of low resistance extending between two points, the area being formed by depositing a metal layer on the two points to be joined, contacting each of the points with an electrical probe which is in circuit with a charged capacitor, and discharging the capacitor through the electrical probes.

Other objects of the invention will, in part, appear hereinafter and will, in part, be obvious.

For a better understanding of the nature and objects of the invention, reference should be had to the following detailed description and drawings, in which.

In accordance with the present invention and attainment of the foregoing objects, there is provided a body of a relatively high resistance semiconductor material with or without p-n junctions, having an area of low resistance extending between and joining two points thereof, either on the same or different surfaces, the area being formed by depositing a metal layer on the two points to be joined, contacting each of the metal layers at such points with an electrical probe, the probe being in circuit with a changed capacitor, and discharging the capacitor through the electrical probes.

Figure 1:
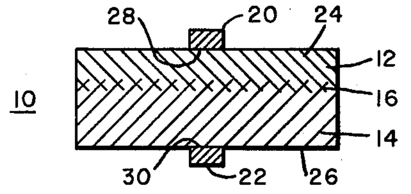
FIGURE 1 is a side view in cross section of a body of semiconductor material.

More specifically, and with reference to FIG. 1, there is illustrated a wafer 1 of a semiconductor material. The wafer 10 may be comprised of any suitable semiconductor material such as silicon, germanium, silicon carbide and stoichiometric III–V and II–VI compounds or mixtures thereof. Examples of suitable stoichiometric III–V compounds include indium antimonide, indium arsenide, gallium antimonide, gallium arsenide, and gallium phosphide. Examples of stoichiometric II–VI compounds include zinc sulfide, zinc telluride and zinc selenide. The semiconductor wafer may be intrinsic doped entirely or in part with n-type or p-type impurities, or it may have one or more p-n junctions.

As shown in FIG. 1, the wafer 10 consists of a p-type region 12, and n-type region 14 and a p-n junction 16 between regions 12 and 14.

Metal layers 20 and 22, shown greatly enlarged, are disposed at predetermined positions on the top surface 24 and the bottom surface 26, respectively, of the wafer 10. The metal layers 20 and 22 may be comprised of any suitable metal, for example, gold, aluminum and base alloys thereof. The metal layers 20 and 22 may be disposed on surfaces 24 and 26 in form of foils or pellets which are fused to the respective surfaces of the wafer or the layers may be in the form of plated or vapor deposited metal coatings. The metal layers 20 and 22 are disposed directly on point 28 and 30, which are the two points it is desired to join by a low resistance path.

Figure 2:
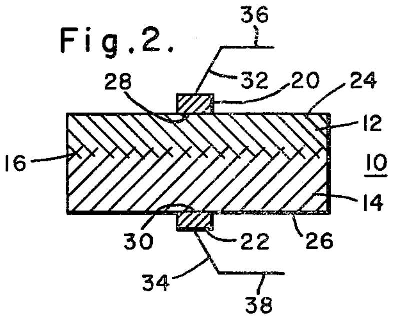
FIGURE 2 is a side view in cross section of the body of semiconductor material of FIGURE 1 being processed in accordance with the teachings of this invention.

With reference to FIG. 2, electrical probes 32 and 34, which are similar to the electrodes used in spot welding and may be comprised of a suitable metal examples of which include steel and copper base alloys, for instance a copper-tungsten alloy, are brought into contact with the metal layers 20 and 22. The probes 32 and 34 are connected through conductors 36 and 38, respectively, with a charged capacitor for example, through a circuit as shown in FIG. 3.

Figure 3:
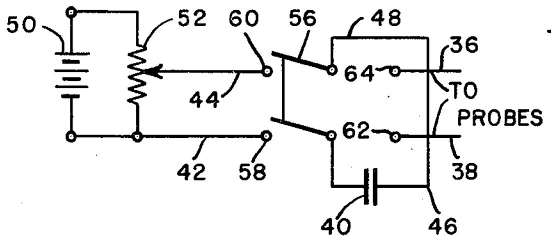
FIGURE 3 is a schematic circuit diagram of the electrical probe capacitor circuit employed in accordance with the teaching of this invention.

With reference to FIG. 3, a capacitor 40 is connected in circuit by conductors 42, 44, 46 and 48 with a source of a direct current voltage 50, which may be a battery, a rectifier or a generator, a variable resistance 52, a double pole-double throw switch 56, and the conductors 36 and 38, which are connected to the probes 32 and 34. In operation, the switch 56 is closed with respect to contacts 58 and 60, and the charge on the capacitor 50 is allowed to build up to a certain level for example from about 8 volts to about 20 volts for the usual wafer thicknesses. The switch 56 in then opened relative to contacts 58 and 60 and closed with contacts 62 and 64, whereby the capacitor 40 is discharged through the electrical probes 32 and 34 while the probes are held in contact with the metal layers and the surfaces 24 and 26 of the wafer 10 at points 28 and 30.

The energy resulting from the discharge of the capacitor 40 through the electrical probes 32 and 34 raises the temperature of the semiconductor material above its melting point locally, that is at the point of discharge and the path between the points. The energy resulting from the electrical discharge may also melt a small quantity of the metal layer, or the molten semiconductor material may dissolve a small quantity of the metal layer. The wafer then cools and the molten portion recrystallizes. The recrystallized region is a path of high conductivity or low resistance and extends between points 28 and 30 on surfaces 24 and 26 respectively of the wafer.

The theory of how this path of low resistance is actually formed is not completely known. In some instances the decrease in resistance is known to be due entirely to disruption of the original crystal lattice during recrystallization, wherein the disruption results in imperfections in the original single crystal lattice structure. In other cases, the imperfections in the crystal structure have been filled, at least partially, with metal from the deposited metal layer, and this too has resulted in the formation of a low resistance path. Regardless of the explanation for the results, it should be understood that there is produced a relatively low resistance path or area between the two parts.

Figure 4:
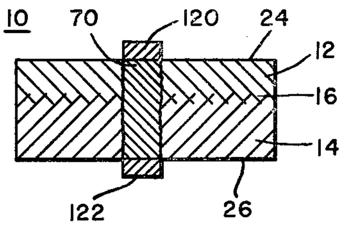
FIGURE 4 is a side view in cross section of a body of semiconductor material processed in accordance with the teachings of this invention.

With reference to FIG. 4, there is illustrated the wafer 10 of semiconductor material of FIG. 2 after recrystallization. The wafer 10 is comprised of the p-type region 12, the n-type region 14, and the p-n junction 16 disposed between the regions 12 and 14. A region 70 of high conductivity or low resistance extends from metal layer 120 on the top surface 24 of the wafer 10 through the wafer to the metal layer 122 on the bottom surface 26. The p-n-junction 16 is destroyed within the region 70 since the p- and n-type doping originally present appears to be redistributed more or less throughout the area.

The quantity of the charge placed upon the capacitor 40 before discharge is dependent on the semiconductor material comprising the wafer, the thickness of the wafer or the distance between the two points to be joined, and the composition of the metal layer employed. Generally, the thicker the material, the higher the voltage of the capacitor. The capacity of the capacitor is proportional to the cross-sectional area of the metal contacts and the distance between the points. For silicon of from 1 to 10 mils thickness the capacitor may have a capacitance of from 500 to 2000 microfarads, and from 8 to 20 volts charging current for a metal area of the order of 100 square mils. To form a region of high conductivity or low resistance between the top and bottom surface of a silicon wafer having a thickness of from about 1 mil to 4.5 mils, employing a metal layer of an area of 10 x 10 mils comprised of an alloy of 99.5% gold–0.5 antimony on both the top and bottom surface of the wafer having a thickness of from about 0.5 mil to 1.4 mils, a charge of about 10 volts was found satisfactory when employing a capacitor having a capacitance of 900 microfarads. To form a region of high conductivity or low resistance between the top and bottom surface of a silicon wafer having a thickness of less than, 1 mil in the manner described above a charge of less than 10 volts for example 8 volts may be satisfactory. If a wafer of substantially greater than 4.5 mils is used, a charge of greater than 10 volts for example 20 volts is necessary. Care must be exercised, however, for too great a charge can result in the cracking of the wafer.

Figure 5:
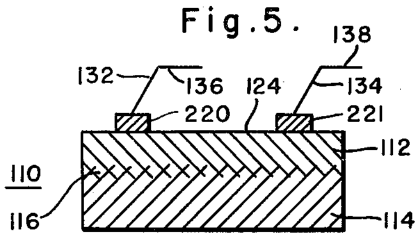
FIGURE 5 is a side view in cross section of a body of semiconductor material undergoing a modification of the processing in accordance with the teachings of this invention; and, FIGURE 6 is a side view in cross section of a body of semiconductor material processed in accordance with the teachings of this invention.

In addition to forming a region of high conductivity or low resistance between two surfaces of a wafer of semiconductor material, the teachings of this invention are also applicable to forming a high conductivity or low resistance region between two points on the same surface of a wafer. With reference to FIG. 5, there is illustrated a wafer 110 of a semiconductor material. The wafer has a region 112 of p-type semiconductivity and a region 114 of n-type semiconductivity. There is a p-n junction 116 between a p-type region 112 and an n-type region 114. A metal layer 220 and a metal layer 221, both in the form of foils are fused to the top surface 124 of the wafer 110. Two electrical probes 132 and 134, which are connected in circuit with a charged capacitor in the manner illustrated in FIG. 3, by conductors 136 and 138, are positioned in contact with the metal layers 220 and 221. The charged capacitor is then allowed to discharge through the probes 132 and 134. A region of high conductivity or low resistance is formed between the metal layers 120 and 121 similar to the manner described above.

Figure 6:
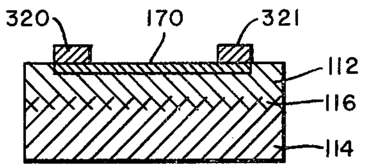

With reference to FIG. 6, there is illustrated the wafer 110 of FIG. 2 after formation of a region 170 of high conductivity or low resistance on one surface thereof.

The region 170 extends from metal layer 320 to metal layer 321. The region 170 is confined entirely within p-type region 112 and does not extend to the p-n junction 116 between regions 112 and 114. It will be understood of course that by varying certain parameters, primarily the thickness of the metal layers deposited on the surface, the region 170 of high conductivity or low resistance could be extended to or through the p-n junction 116. The junction 116 would, of course, be destroyed where it was contacted by or the region 170 passed through it.

This invention provides a means for forming a non-rectifying path through a crystal containing a p-n junction. Such a technique is of vital importance when it is desired to build complete circuits within a unitary block of a semiconductor material, for example, in a monolithic semiconductor device.

The following example is illustrative of the teachings of this invention.

*Example I*

Foils comprised of 99.5% gold and 0.5 antimony were disposed centrally upon the top and bottom surface of a wafer of single crystal silicon. Each foil was 10 mils by 10 mils, and the foil on the top surface had a thickness of 0.5 mil and the foil on the bottom surface had a thickness of 1.4 mils.

The wafer of single crystal silicon was 50 mils in diameter and 1.4 mils thick, and having a p-type region 0.4 mil thick with a resistivity of 10 ohm-cm. and an n-type region of 1 mil thickness with a resistivity of 200 ohm-cm. forming a p-n junction between the p- and n-type regions. This wafer would have a total resistivity of about 100 ohm-cm. when biased in the forward direction, and a total resistivity of about 10,000 ohm-cm. when biased in the reverse direction. The wafer and foils were disposed in a furnace. The furnace was evacuated to a vacuum of $10^{-5}$ mm. Hg and the foils fused to the wafer at a temperature of about 700° C. The wafer was then allowed to cool, and removed from the furnace.

A capacitor connected in circuit with a voltage source, a variable resistance and two electrical probes was charged to 10 volts. The capacitor had a capacitance of 900 microfarads.

One of the electrical probes was put in contact with the gold-antimony layer on the top surface of the wafer, and the other probe was put in contact with the gold-antimony layer on the bottom surface of the wafer. The capacitor was then discharged through the electrical probes.

The energy resulting from the discharge melted the silicon in the immediate area of the probes and foils (silicon M.P. 1427° C.). The melted portion was then allowed to cool and recrystallize. The metal foils were well bonded to the recrystallized portion.

The resultant structure was similar to that illustrated in FIG. 4. The recrystallized region had a resistance of 2 to 3 ohms between the foils.

Equally satisfactory results are achieved where aluminum is substituted for the gold-antimony alloy in Example I. Equally satisfactory results may also be realized if the metal is disposed on the wafer in the form of a pellet, or is plated or vapor deposited.

While this invention has been described with reference to patricular embodiments and examples, it will be understood that modifications, substitutions and the like may be made therein without departing from its scope.

I claim as my invention:

1. A process for forming a low resistance, non-rectifying path between two points of a body of a semiconductor material having a metal layer affixed to the body at each of the two points to be joined, by said low resistance non-rectifying path, comprising affixing a metal layer to the body of semiconductor material at each of the two points to be joined, thereafter discharging a charged capacitor between the two points so that the semiconductor material in the immediate area of discharge and the metal layer are melted, and recrystallizing the molten portion of the body of semiconductor material to room temperature, whereby the molten material by cooling the recrystallized portion forming a path of low resistance to an electrical current flowing in either direction, between the two points, said path having substantially no rectifying properties.

2. A process for forming an area of low resistance between two points of a body of a semiconductor material comprising, affixing a metal layer of a restiricted area on the two points to be joined by said area of low resistance, contacting each of the metal layers with an electrical probe which is connected in circuit with a charged capacitor, thereafter discharging the capacitor through the electrical probes so that the semiconductor material in the immediate area of discharge and the metal layers are melted, and recrystallizing the molten portion of the body of semiconductor material, the recrystallized portion forming a path of low resistance to an electrical current flowing in either direction, said path extending between the metal layers.

3. A process for forming an area of low resistance between two points of a body of a semiconductor material having a relatively high resistance comprising, depositing by vapor deposition a metal layer of selected area on the two points to be joined, thereafter contacting each of the metal layers with an electrical probe which is connected in circuit with a charged capacitor, discharging the capacitor through the electrical probes so that the semiconductor material in the immediate area of discharge and the metal layers are melted, and recrystallizing the molten portion of the body of semiconductor material, the recrystallized portion forming a path of low resistance to an electrical current flowing in either direction, said path extending between the metal layers.

4. A process for forming a low resistance path between two points of a body of a semiconductor material of relatively high resistance comprising, disposing and affixing a metal foil to the body at each of the two points to be joined, thereafter contacting each of the metal layers with an electrical probe which is connected in circuit with a charged capacitor, discharging the capacitor through the electrical probes so that the semiconductor material in the immediate area of discharge between the two points and the metal layers are melted, and recrystallizing by cooling the molten portion of the body of semiconductor material, the molten material forming a path of low resistance to an electrical current flowing in either direction, said path extending between the metal foils.

5. A process for forming an area of low resistance between two points of a body of a silicon semiconductor material of a thickness of from 1 mil to 10 mils comprising, affixing a layer of gold of the order of 100 square mils on each of the two points to be joined, thereafter contacting each of the metal layers with an electrical probe which is connected in circuit with a charged capacitor the capacitor being charged at from 8 to 20 volts and having a capacitance of from 500 to 2000 microfarads, discharging the capacitor through the electircal probes so that the semiconductor material in the immediate area of discharge between the two layers of gold and the metal layers are melted, and recrystallizing by cooling the body of semiconductor material forming a path of low resistance to an electrical current flowing in either direction, said path extending between the layers of gold.

References Cited by the Examiner

UNITED STATES PATENTS

| | | | |
|---|---|---|---|
| 2,671,156 | 3/54 | Douglas et al. | 148—1.5 X |
| 2,813,048 | 11/57 | Pfann | 148—1.6 |
| 2,883,544 | 4/59 | Robinson | 148—1.5 X |
| 3,015,591 | 1/62 | Zaratkiewicz et al. | 148—1.5 |

FOREIGN PATENTS

| | | |
|---|---|---|
| 1,230,268 | 3/60 | France. |

DAVID L. RECK, *Primary Examiner.*

RAY K. WINDHAM, *Examiner.*